Patented Oct. 24, 1939

2,177,371

UNITED STATES PATENT OFFICE 2,177,371

DISAZO DYES

Mordecai Mendoza, Blackley, Manchester, England, assignor to Imperial Chemical Industries Limited, a corporation of Great Britain No Drawing. Application July 13, 1938, Serial No. 219,095. In Great Britain July 21, 1937

6 Claims. (Cl. 260—184)

A. This invention relates to the manufacture and use of new disazo dyestuffs, and in particular to the manufacture of dyestuffs for dyeing and staining leather.

B. According to the invention the new dyestuffs are made by coupling with a meta-diamine of the benzene series capable of coupling twice, one molecular equivalent of the diazo derivative of salicylic acid, which may or may not carry a sulfonic acid group, and one molecular equivalent of the diazo derivative of 4-amino-4'-nitro-diphenylamine-2'-sulfonic acid.

C. The new dyestuffs are useful for dyeing and staining leather of all tannages, and they do so in level brown shades of good fastness to light and washing.

D. Examples of azo dyes of this type are:

3-amino-5-sulfosalicylic acid→meta-phenylene-diamine←4-amino-4'-nitro-diphenylamine-2'-sulfonic acid.

3-amino-5-sulfosalicylic acid→meta-toluylene-diamine←4-amino-4'-nitro-diphenylamine-2'-sulfonic acid.

2-hydroxy-3-amino-5-sulfobenzoic acid→1-chloro-2,4-diamino-benzene←4-amino-4'-nitro-diphenylamine-2'-sulfonic acid.

2-hydroxy-3-amino-5-sulfobenzoic acid→1-nitro-2,4-diamino-benzene←4-amino-4'-nitro-diphenylamine-2'-sulfonic acid.

5-amino-2-hydroxy-benzoic acid→meta-phenylene-diamine←4-amino-4'-nitro-diphenylamine-2'-sulfonic acid.

E. The following examples illustrate the method of preparing such colors. The parts are by weight.

Example I

To the diazo solution obtained from 23.3 parts of 2-hydroxy-3-amino-5-sulfo-benzoic acid, in the usual manner, there is added with stirring, a solution of 10.8 parts of meta-phenylene-diamine in 200 parts of water and coupling is allowed to proceed at the ordinary temperature in the resulting mineral acid medium for about 12 hours. At the end of this period the mineral acidity is removed by adding sodium acetate and the coupling is allowed to complete in the course of one hour. Ice is then added to the reddish-orange colored suspension so-obtained to cool it to 10° C. There is then added the diazo suspension obtained from 30.9 parts of 4-amino-4'-nitro-diphenylamine-2'-sulfonic acid obtained as in the following paragraph:

The 4-amino-4'-nitro-diphenylamine-2'-sulfonic acid is suspended in 300 parts of water, the suspension is raised to the boil with stirring and sufficient anhydrous sodium carbonate is added to effect complete solution and to impart a faintly alkaline reaction. The solution is now cooled to 70° C. by adding sufficient ice and 10 parts of solid sodium nitrite in a 10% aqueous solution are now run in. More ice is now added until the temperature drops to 55° C. when there is quickly charged in 34 parts of hydrochloric acid (36%). After stirring for a few minutes the temperature of the resulting diazo suspension is reduced to below 10° C. by a further addition of ice.

When this second diazo component has been run into the monazo combination caustic soda solution is added in a thin stream until the reaction is definitely alkaline to red litmus paper. The second coupling is allowed to complete in the course of 3 to 4 hours and results in the formation of a dark reddish-brown solution.

The dyestuff is isolated by adding sodium chloride to make a 20% solution, followed by enough strong hydrochloric acid to make the reaction just acid to Congo red paper. It is then filtered. When dried and ground it is a dark brown powder readily soluble in water. It dyes leather in chocolate brown shades.

By substituting meta-toluylene-diamine for the meta-phenylene-diamine, in the above combination and proceeding as otherwise indicated, there is finally obtained a dyestuff which yields somewhat redder shades of brown on leather.

Example II

To the diazo solution obtained from 23.2 parts of 2-hydroxy-3-amino-5-sulfo-benzoic acid, in the usual manner, there is added with stirring a solution of 14.25 parts of 1-chloro-2,4-diamino-benzene in 200 parts of water, containing 8.5 parts of hydrochloric acids (36%). Ice is added to cool the mixture to 10° C. and caustic soda solution is added dropwise until the reaction to blue litmus paper is only faintly acid. Coupling is allowed to complete during 12 hours and the resulting yellow-brown monoazo suspension is then combined with the diazo suspension from 30.9 parts of 4-amino-4'-nitro-diphenylamine-2'-sulfonic acid as in Example I. On completion of the second coupling the diazo dyestuff is isolated by salting to 20% and making just acid to Congo red paper. When dried and ground it is a dark brown powder readily soluble in water. It yields mid-brown shades on leather.

Substitution of 1-nitro-2,4-diamino-benzene for 1-chloro-2,4-diamino-benzene of the above combination results in the formation of a dyestuff yielding yellow-brown shades on leather.

Example III 15.3 parts of 5-amino-2-hydroxy-benzoic acid are diazotized in customary manner and to the diazo suspension there is added a solution of 10.8 parts of meta-phenylene-diamine in 200 parts of water. The mineral acid reaction of the mixture is removed by means of sodium acetate and coupling is allowed to complete at the ordinary temperature during about 12 hours. To the brown monoazo suspension so obtained there is added the diazo suspension prepared from 30.9 parts of 4-amino-4'-nitro-4'-nitro-diphenylamine-2'-sulfonic acid as in Example I. Ice is added to cool the mixture to below 10° C. and after stirring for a few minutes, caustic soda solution is added in quantity to impart an alkaline reaction to red litmus paper. The second coupling is allowed to complete in the course of three to four hours when the disazo dyestuff is isolated from the resulting dark brown solution by adding sufficient sodium chloride to form a 20% solution. It is then filtered off, dried, and ground. It yields nigger-brown shades on leather.

F. As many apparent widely different embodiments of this invention may be made without departing from the spirit and scope thereof, it is to be understood that I do not limit myself to the specific embodiments thereof except as defined in the appended claims.

I claim:

1. The compound represented by the formula:

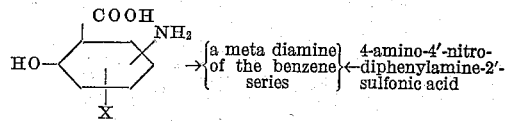

in which X is one of a group consisting of H and SO$_3$H.

2. The compound represented by the formula:

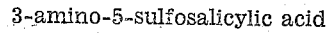

the arrows indicating diazotization and coupling.

3. The compound represented by the formula:

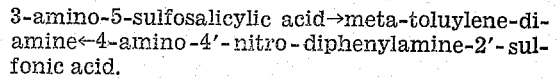

4. The compound represented by the formula:

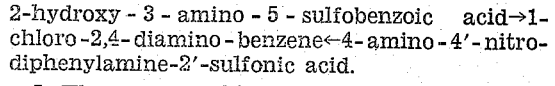

5. The process which comprises coupling to a meta-phenylene-diamine one molecular equivalent of an azotized salicylic acid and one molecular equivalent of an azotized 4-amino-4'-nitro-diphenylamine-2'-sulfonic acid.

6. Process for the manufacture of new disazo dyestuffs which comprises coupling with a meta-diamine of the benzene series capable of coupling twice, one molecular equivalent of the diazo derivative of an amino-salicyclic acid, which may contain a sulfonic acid group, and one molecular equivalent of the diazo derivative of 4-amino-4'-nitro-diphenylamine-2'-sulfonic acid.

MORDECAI MENDOZA.

CERTIFICATE OF CORRECTION.

Patent No. 2,177,371. October 24, 1939.

MORDECAI MENDOZA.

It is hereby certified that error appears in the printed specification of the above numbered patent requiring correction as follows: Page 1, second column, line 44, Example II, for the word "acids" read acid; page 2, first column, line 19, Example III, for "4-amino-4'-nitro-4'-nitro-diphenylamine-2'-" read 4-amino-4'-nitro-diphenylamine-2'-; and that the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.